United States Patent
Sumitomo et al.

(10) Patent No.: US 7,298,918 B2
(45) Date of Patent: Nov. 20, 2007

(54) IMAGE PROCESSING APPARATUS CAPABLE OF HIGHLY PRECISE EDGE EXTRACTION

(75) Inventors: Hironori Sumitomo, Nishinomiya (JP); Yuichi Kawakami, Nishinomiya (JP)

(73) Assignee: Minolta Co., Ltd., Osaka (JP)

( * ) Notice: Subject to any disclaimer, the term of this patent is extended or adjusted under 35 U.S.C. 154(b) by 865 days.

(21) Appl. No.: 10/601,965

(22) Filed: Jun. 23, 2003

(65) Prior Publication Data

US 2004/0190778 A1      Sep. 30, 2004

(30) Foreign Application Priority Data

Mar. 24, 2003   (JP) .............................. 2003-080314

(51) Int. Cl.
   *G06K 9/40*   (2006.01)
(52) U.S. Cl. ............... 382/266; 382/167; 382/260; 382/269; 358/3.26; 358/3.27; 358/518
(58) Field of Classification Search ............... 382/260, 382/266, 269, 274, 275, 167, 3.27, 518; 358/3.26, 358/3.27, 463, 518
See application file for complete search history.

(56) References Cited

U.S. PATENT DOCUMENTS

| | | | | |
|---|---|---|---|---|
| 5,291,300 A | * | 3/1994 | Ueda | 386/117 |
| 5,315,413 A | * | 5/1994 | Yamamoto et al. | 358/512 |
| 5,712,474 A | * | 1/1998 | Naneda | 250/208.1 |
| 5,825,938 A | * | 10/1998 | De Lange | 382/263 |
| 6,141,446 A | * | 10/2000 | Boliek et al. | 382/233 |
| 6,173,084 B1 | * | 1/2001 | Aach et al. | 382/260 |
| 6,356,300 B1 | * | 3/2002 | Shiba | 348/130 |
| 6,665,439 B1 | * | 12/2003 | Takahashi | 382/199 |
| 6,674,880 B1 | * | 1/2004 | Stork et al. | 382/128 |
| 6,819,790 B2 | * | 11/2004 | Suzuki et al. | 382/156 |
| 6,842,538 B2 | * | 1/2005 | Lee et al. | 382/224 |

FOREIGN PATENT DOCUMENTS

| | | |
|---|---|---|
| JP | 2000-013607 A | 1/2000 |
| JP | 2002-175534 A | 6/2002 |

* cited by examiner

*Primary Examiner*—Yosef Kassa
(74) *Attorney, Agent, or Firm*—Sidley Austin LLP

(57) ABSTRACT

An image processing apparatus first forms an edge image of an input image using, for example, SOBEL operator, and performs a smoothing process on the formed edge image by using an average filter. Thereafter, the image processing apparatus calculates a difference between the edge image and the edge smoothed image, and binarizes the edge image based on the difference.

16 Claims, 6 Drawing Sheets

FIG.3

| | ① | ② | ③ | ④ | ⑤ | ⑥ | ⑦ | ⑧ | ⑨ | ⑩ | ⑪ |
|---|---|---|---|---|---|---|---|---|---|---|---|
| A-4 | | 0 | 0 | 10 | 20 | 25 | 45 | 0 | 0 | 0 | 0 |
| B-4 | | 0 | 0 | 0 | 0 | 0 | 20 | 0 | 0 | 0 | 0 |
| C-4 | | 10 | 10 | 10 | 10 | 0 | 0 | 10 | 10 | 10 | 0 |

FIG.4

| | ① | ② | ③ | ④ | ⑤ | ⑥ | ⑦ | ⑧ | ⑨ | ⑩ | ⑪ |
|---|---|---|---|---|---|---|---|---|---|---|---|
| A-5 | | | | | 14.3 | 14.3 | 14.3 | 12.9 | | | |
| B-5 | | | | | 2.9 | 2.9 | 2.9 | 2.9 | | | |
| C-5 | | | | | 7.1 | 7.1 | 7.1 | 7.1 | | | |

FIG.5

| | ① | ② | ③ | ④ | ⑤ | ⑥ | ⑦ | ⑧ | ⑨ | ⑩ | ⑪ |
|---|---|---|---|---|---|---|---|---|---|---|---|
| A-6 | | | | | 5.7 | 10.7 | 30.7 | -12.9 | | | |
| B-6 | | | | | -2.9 | -2.9 | 17.1 | -2.9 | | | |
| C-6 | | | | | 2.9 | -7.1 | -7.1 | 2.9 | | | |

FIG.9

|   | ① | ② | ③ | ④ | ⑤ | ⑥ | ⑦ | ⑧ | ⑨ | ⑩ | ⑪ |
|---|---|---|---|---|---|---|---|---|---|---|---|
| A-1 | 0 | 0 | 0 | 10 | 30 | 55 | 100 | 100 | 100 | 100 | 100 |
| B-1 | 0 | 0 | 0 | 0 | 0 | 0 | 20 | 20 | 20 | 20 | 20 |
| C-1 | 80 | 90 | 100 | 110 | 120 | 120 | 120 | 110 | 100 | 90 | 80 |

FIG.10

|   | ① | ② | ③ | ④ | ⑤ | ⑥ | ⑦ | ⑧ | ⑨ | ⑩ | ⑪ |
|---|---|---|---|---|---|---|---|---|---|---|---|
| A-2 |   |   |   | 27.9 | 42.1 | 56.4 | 70.7 | 83.6 |   |   |   |
| B-2 |   |   |   | 2.9 | 5.7 | 8.6 | 11.4 | 14.3 |   |   |   |
| C-2 |   |   |   | 105.7 | 110 | 111.4 | 110 | 105.7 |   |   |   |

FIG.11 PRIOR ART

|   | ① | ② | ③ | ④ | ⑤ | ⑥ | ⑦ | ⑧ | ⑨ | ⑩ | ⑪ |
|---|---|---|---|---|---|---|---|---|---|---|---|
| A-3 |   |   |   | -17.9 | -12.1 | -1.4 | 29.3 | 16.4 |   |   |   |
| B-3 |   |   |   | -2.9 | -5.7 | -8.6 | 8.6 | 5.7 |   |   |   |
| C-3 |   |   |   | 4.3 | 10 | 8.6 | 10 | 4.3 |   |   |   |

IMAGE PROCESSING APPARATUS CAPABLE OF HIGHLY PRECISE EDGE EXTRACTION

This application is based on Japanese Patent Application No. 2003-80314 filed with Japan Patent Office on Mar. 24, 2003, the entire content of which is hereby incorporated by reference.

BACKGROUND OF THE INVENTION

1. Field of the Invention

The present invention relates to an image processing apparatus, an image processing program product and an image pick-up apparatus. More specifically, the present invention relates to an image processing apparatus, an image processing program product and an image pick-up apparatus that are capable of extracting edge portions with high precision.

2. Description of the Related Art

Conventionally, a technique has been proposed in which each pixel of an image prepared by extracting edge components from an image input through a camera or the like (hereinafter referred to as an edge image) is compared in magnitude with a threshold value set in advance, to form an image having edge portions and non-edge portions distinguished from each other (hereinafter referred to as an edge binarized image). When the threshold value is set large in such a technique, it becomes difficult to extract a portion that is desirable to be extracted as the edge portion, if that portion is a thin line with small gradation difference. On the contrary, when the threshold value is set small, it becomes possible to extract that portion of the input image which has small gradation difference. However, it becomes more likely that edge components that exist around the original edge component that has been successfully extracted are undesirably extracted as edge portions as well, resulting in an edge portion that is too thick. Further, there is a higher possibility that not only a thin line but also noise components would undesirably be extracted. Thus, it has been very difficult to determine a right threshold value that can simultaneously solve both of the above described problems.

Japanese Laid-Open Patent Publication No. 2000-13607 discloses an image processing method in which an image prepared by smoothing an input image (hereinafter referred to as a smoothed image) is subtracted from the input image, an edge component is extracted based on the result of subtraction, and the edge component is binarized by using a prescribed threshold value, whereby an edge portion and a non-edge portion are distinguished from each other.

The image processing method disclosed in Japanese Laid-Open Patent Publication No. 2000-13607 will be specifically described.

FIG. 9 represents an image A-1 having large gradation difference, an image B-1 having a small gradation difference, and an image C-1 having moderate gradation with the gradation difference changing like a wave. According to the image processing method disclosed in Japanese Laid-Open Patent Publication No. 2000-13607, first, the input images are smoothed using an average filter. Edge smoothed images A-2, B-2 and C-2 obtained by averaging the input images of FIG. 9 by taking 7 pixels by 7 pixels are shown in FIG. 10.

Thereafter, according to the image processing method disclosed in Japanese Laid-Open Patent Publication No. 2000-13607, difference between the input image (or the image for outline extraction) and the smoothed image is calculated. Results of subtraction A-3, B-3 and C-3 of smoothed images A-2, B-2 and C-2 shown in FIG. 10 from the input images A-1, B-1 and C-1 shown in FIG. 9 are shown in FIG. 11.

Japanese Laid-Open Patent Publication No. 2002-175534 discloses a method in which an edge image is formed from an input image, and using an average value and standard deviation of the edge component of the edge image, an edge binarized image is formed.

The method disclosed in Japanese Laid-Open Patent Publication No. 2000-13607 has a problem that when there is a portion having wave-like gradation difference where the gradation changes moderately, the peak portion of the wave that should not be extracted as an edge is undesirably extracted as an edge portion. More specifically, in the method disclosed in Japanese Laid-Open Patent Publication No. 2000-13607, the portion ⑦ is extracted as the edge portion based on the result of subtraction B-3 shown in FIG. 11, and therefore, when the threshold value is set to 8 as an example, portions ⑦ and ⑧ of input image A-1 would be extracted as the edge portion based on the result of subtraction A-3. Thus, the extracted edge portion becomes rather thick. When the edge portion is detected thick, it becomes sometimes difficult to detect accurate position of an object. Further, in the result of subtraction C-3, values of portions ⑤ to ⑦ are higher than the threshold value 8, and therefore, these portions in input image C-1 are undesirably extracted as the edge portion, though these portions actually have the wave-like gradation difference with moderately changing gradation.

The method disclosed in Japanese Laid-Open Patent Publication No. 2002-175534 also has a problem that it is difficult to extract, as an edge portion, a portion having small gradation difference such as a thin line existing in an input image of which portions mostly have large gradation difference.

SUMMARY OF THE INVENTION

Therefore, an object of the present invention is to provide an image processing apparatus, an image processing program and an image pick-up apparatus that are capable of extracting edge portions with high precision.

The above described object of the present invention is attained by an image processing apparatus including the following elements. Specifically, the image processing apparatus includes an edge image forming unit extracting an edge from an input image and forming an edge image, an edge smoothed image forming unit smoothing the edge image to from an edge smoothed image, a difference calculating unit calculating difference between the edge image and the edge smoothed image, and a binarizing unit binarizing the edge image based on the difference.

According to another aspect, the present invention provides an image processing program product that makes a computer execute an image processing, including an edge smoothed image forming step of smoothing an edge image formed based on an input image and forming an edge smoothed image, a difference calculating step of calculating difference between the edge image and the edge smoothed image, and a binarizing step of binarizing the edge image based on the difference.

According to a still further aspect, the present invention provides an image pick-up apparatus including an image pick-up unit picking-up an object and capturing an object image, an edge image forming unit forming an edge image by extracting an edge from the picked-up image, an edge smoothed image forming unit forming an edge smoothed image by smoothing the edge image, a difference calculating unit calculating difference between the edge image and the edge smoothed image, and a binarizing unit binarizing the edge image based on the difference.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 represents specific examples of edge images.

FIG. 4 represents specific examples of edge smoothed images averaged by taking 7 pixels by 7 pixels of the input image.

FIG. 5 represents specific examples of results of subtraction of the edge smoothed images from the edge images.

FIG. 9 represents specific examples of input images.

FIG. 10 represents specific examples of edge smoothed images averaged by taking 7 pixels by 7 pixels of the input image.

FIG. 11 represents specific examples of results of subtraction of the edge smoothed images from the input images.

DESCRIPTION OF THE PREFERRED EMBODIMENTS

Figure 1:
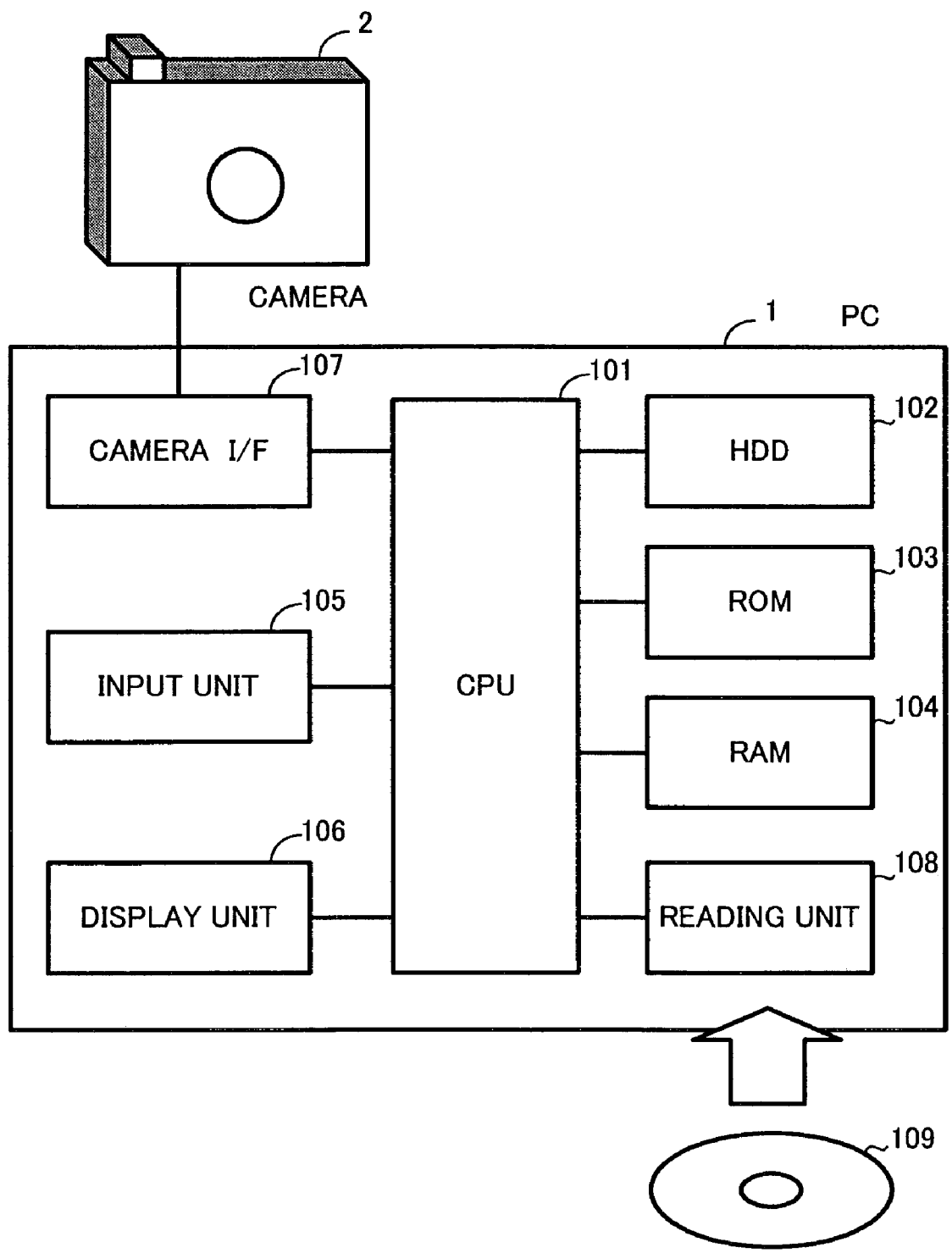
FIG. 1 shows a specific exemplary configuration of an image processing system in accordance with an embodiment.

Embodiments of the present invention will be described with reference to the figures. In the following description, same or corresponding elements are denoted by the same reference characters. Names and functions of these portions are also the same. Therefore, detailed description thereof will not be repeated.

Referring to FIG. 1, the image processing system in accordance with the present invention includes a camera 2 inputting images to an image processing apparatus such as a personal computer (hereinafter referred to as a PC), and PC 1 processing the images obtained from camera 2. The image processing apparatus of the present invention is not limited to the personal computer as specifically represented in the present embodiment, and the apparatus may be implemented as a semiconductor chip, or as an image processing board.

Further referring to FIG. 1, PC 1 as the image processing apparatus is controlled by a CPU (Central Processing Unit) 101, and processes an image input from camera 2 through a camera I/F (interface) 107 (which is also referred to as an image capturing unit). The program executed by CPU 101 is stored in a HDD (Hard Disk Drive) 102 or a ROM (Read Only Memory) 103 as a storing unit. Alternatively, the program executed by CPU 101 is read by a reading unit 108 from a storage medium 109 such as a CD-ROM (Compact Disc-ROM). A RAM (Random Access Memory) 104 serves as a temporary work space when the program is executed by CPU 101. Further, RAM 104 also serves as a buffer, that is, a temporary storage area, for the following processes. A user inputs information and instructions through an input unit 105 including a keyboard and a mouse. Images received from camera 2 and results of processing thereof are displayed on a display unit 106. The configuration shown in FIG. 1 is a general configuration of a personal computer, and the configuration of PC 1 is not limited to that shown in FIG. 1.

Camera 2 may be any general apparatus, such as a video recorder, which has means for capturing an image and for inputting the same to PC 1.

Figure 2:
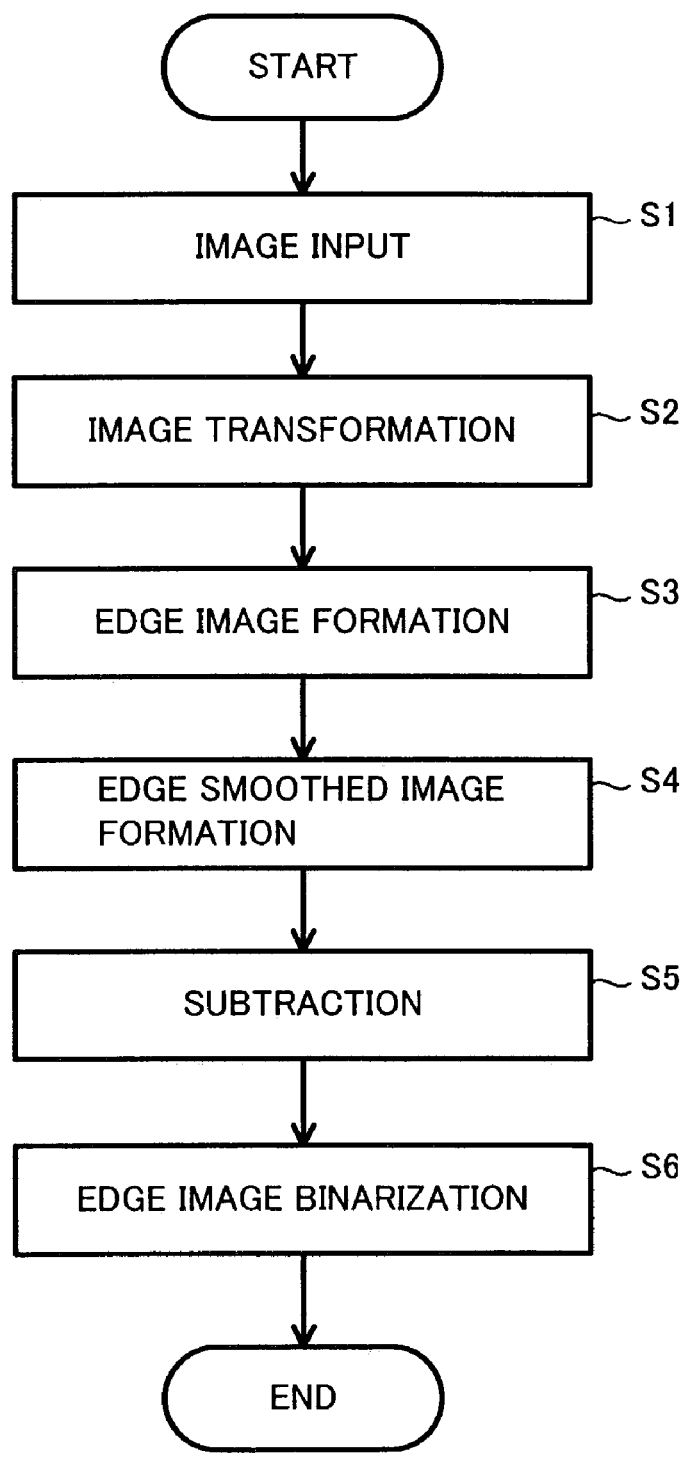
FIG. 2 is a flow chart representing the process executed by the image processing system in accordance with the embodiment.

In such an image processing system, the following image processing is executed, an edge image is formed from the image captured by camera 2, and the edge image is binarized. FIG. 2 is a flow chart representing the process executed by the image processing system in accordance with the present embodiment, realized by the program read by CPU 101 of PC 1 from HDD 102 or ROM 103 or the program obtained by reading unit 108 from storage medium 109, and executed by RAM 104.

Referring to FIG. 2, first, CPU 101 of PC 1 receives an input of an object image OI (x, y) from camera 2 through camera I/F 107 (S1). Here, the input object image OI (x, y) input from camera 2 is either a color image or a gray scale image.

Thereafter, CPU 101 executes the program to transform the input object image OI (x, y) to a gray scale image GI (x, y) (S2). In step S2, when the input object image OI (x, y) is a color image, the calculation represented by Equation (1) below is performed on each pixel of the input object image OI (x, y), to transform the input object image OI (x, y) to the gray scale image GI (x, y):

$$GI(x,y)=0.299 \times ROI(x,y) +0.587 \times GOI(x,y) +0.114 \times BOI(x,y) \quad (1)$$

where (x, y) represents coordinates indicating the pixel position in the image, ROI (x, y) represents an R plane of the input object image OI (x, y) that is a color image, BOI (x, y) represents a B plane of the input object image OI (x, y) that is a color image, and GOI (x, y) represents a G plane of the input object image OI (x, y) that is a color image.

When the input object image OI (x, y) input in step S1 is already a gray scale image GI (x, y), the process of step S2 is omitted, and the process proceeds to the next step.

Next, CPU 101 extracts an edge component from the gray scale image GI (x, y) transformed in step S2, and forms an edge image EI (x, y) (S3). As to the method of forming an edge image EI (x, y) in step S3, various conventional methods may by utilized, and not specifically limited in the present invention. By way of example, a method may be used in which the calculation represented by Equation (2) below is performed on each pixel of the gray scale image GI (x, y):

$$EI(x, y) = \sqrt{(GI(x, y) - GI(x, y - 1))^2 + (GI(x, y) - GI(x - 1, y))^2} \quad (2)$$

The forming method mentioned above is generally well-known, by which the difference value between adjacent pixels is extracted as an edge component.

Alternatively, a method using SOBEL operator represented by Equation (3) or a method using PREWITT operator represented by Equation (4) may also be utilized, to similarly form the edge image EI (x, y). Further, similar effects can be attained by forming the edge image EI (x, y) using a method of extracting edge components other than the methods described below.

$$EI_x(x, y) = \begin{pmatrix} -1 & -2 & -1 \\ 0 & 0 & 0 \\ 1 & 2 & 1 \end{pmatrix} \times GI(x, y)$$
$$EI_y(x, y) = \begin{pmatrix} -1 & -2 & 1 \\ -2 & 0 & 2 \\ -1 & 0 & 1 \end{pmatrix} \times GI(x, y)$$
$$EI(x, y) = \sqrt{(EI_x(x, y))^2 + (EI_y(x, y))^2}$$
(3)

$$EI_x(x, y) = \begin{pmatrix} -1 & -1 & -1 \\ 0 & 0 & 0 \\ 1 & 1 & 1 \end{pmatrix} \times GI(x, y)$$
$$EI_y(x, y) = \begin{pmatrix} -1 & 0 & 1 \\ -1 & 0 & 1 \\ -1 & 0 & 1 \end{pmatrix} \times GI(x, y)$$
$$EI(x, y) = \sqrt{(EI_x(x, y))^2 + (EI_y(x, y))^2}$$
(4)

Here, EIx (x, y) and EIy (x, y) represent an edge image with edge component along the X direction extracted and an edge image with edge component along the Y direction extracted, respectively.

Thereafter, CPU 101 performs a smoothing process on the edge image EI (x, y) formed in step S3, to form an edge smoothed image EHI (x, y) (S4). In step S4, the edge smoothed image EHI (x, y) is formed by using an average filter. Specifically, a method represented by Equation (5) below using an average filter of 7 pixels×7 pixels is used.

$$EHI(x, y) = \frac{1}{49} \begin{pmatrix} 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \end{pmatrix} \times EI(x, y)$$
(5)

The method of forming the edge smoothed image EHI (x, y) in step S4 is not limited to the method represented by Equation (5) above, and similar processing is possible using an average filter of different size. A larger filter size is advantageous in that the edge image EI (x, y) can be made smoother, while it is disadvantageous in that amount of calculation increases. Through trials, the inventors have found that the filter size of 5 pixels×5 pixels to 11 pixels×11 pixels is preferable, and 7 pixels×7 pixels given in Equation (5) is most preferable.

Thereafter, CPU 101 calculates the difference Diff between edge image EI (x, y) formed in step S3 and edge smoothed image EHI (x, y) formed in step S4, in accordance with Equation (6) below.

Diff=EI (x,y)-EHI (x,y)     (6)

Then, CPU 101 binarizes edge image EI (x, y) in accordance with the value of difference Diff calculated in step S5, to form an edge binarized image EB (x, y) (S6). Here, a pixel of which value of difference Diff is larger than a preset threshold value TH is regarded as an edge portion, to form the edge binarized image EB (x, y).

In the manner described above, image processing by PC 1 is completed, and an edge binarized image can be obtained from the image captured by camera 2.

The value of difference Diff calculated in step S5 tends to be relatively large at a portion having a small gradation difference but to be extracted as an edge portion, and the value tends to be very small where the gradation difference changes moderately like a wave. Such tendency will be described with reference to specific examples of image processing above. Though the input image is considered as one-dimensional for convenience of description in the following, it would be readily understood that the same applies similarly to two-dimensional images.

Assume that PC 1 receives the images shown in FIG. 9 described above, i.e. the image A-1 having large gradation difference, the image B-1 having small gradation difference, and the image C-1 having gradation difference moderately changing like a wave, as inputs from camera 2. CPU 101 of PC 1 calculates the difference between adjacent pixels of respective input images A-1, B-1 and C-1 in step S3 described above to extract edge components, and forms the edge images A-4, B-4 and C-4 shown in FIG. 3, respectively.

Thereafter, CPU 101 of PC 1 subtracts respective edge smoothed images A-5, B-5 and C-5 from edge images A-4, B-4 and C-4, to obtain results of subtraction A-6, B-6 and C-6, as shown in FIG. 5. Specifically, the following calculations are executed to obtain the results A-6, B-6 and C-6:

(A-6)=(A-4)-(A-5)

(B-6)=(B-4)-(B-5)

(C-6)=(C-4)-(C-5).

Here, if the threshold value is set to 18, for example, to extract the portion ⑦ of edge image B-4 as an edge portion, portions ⑤ to ⑦ would be extracted in edge image A-4, resulting in a thick edge portion.

When the threshold value is set to 15, for example, to extract the portion ⑦ of input image B-1 as an edge portion based on the result of subtraction B-6, only the portion ⑦ in input image A-1 is extracted as an edge portion based on the result of subtraction A-6. Namely, edge portions can be extracted successfully from both the portion having large gradation difference and the portion having small gradation difference. Further, it is noted that every pixel value is much lower than the threshold value TH=15 in the result of subtraction C-6, and therefore, an edge portion is not extracted from the portion having the gradation difference changed moderately like a wave.

Figure 6:
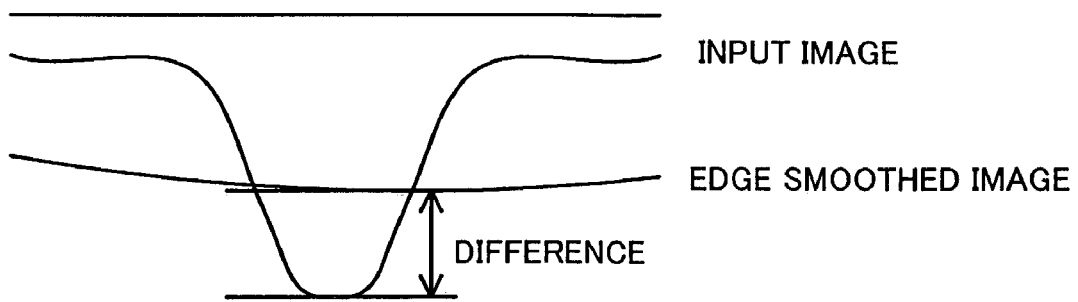
FIGS. 6 and 7 illustrate the principle of edge portion extraction.

This can be explained with reference to FIGS. 6 and 7. Specifically, when the input image has gradation difference, the pixel values of the edge image change considerably as shown in FIG. 6. Therefore, the portion of the edge image having high pixel values, that is, the edge portion, comes to have large difference from the edge smoothed image. Accordingly, by setting a prescribed threshold value in consideration of the difference between the edge image and the edge smoothed image, the edge portion can be extracted.

Figure 7:
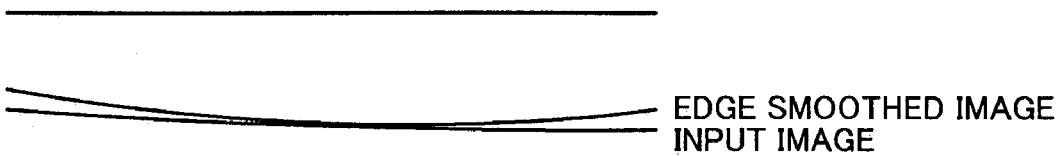

When the gradation of the input image changes moderately, the change in pixel values of the edge image is small, as can be seen from FIG. 7. Therefore, the difference between the edge image and the edge smoothed image comes to be very small. Accordingly, by setting a prescribed threshold value in consideration of the difference between the edge image and the edge smoothed image, it becomes possible not to extract the peak portion of the wave of the moderately changing gradation as the edge portion.

As described above, when the method in which the edge is binarized based on the difference between the edge image and the edge smoothed image is used, it becomes possible to extract the portion having a large gradation difference without making the edge portion thick. Further, the peak portion of the wave of moderately changing gradation is not extracted as an edge portion, and hence, edge detection with higher precision becomes possible.

In the embodiment above, it is described that a color image is transformed to a gray scale image and thereafter edge component is extracted, in steps S2 and S3. Similar effects can be attained when the process of step S3 is performed to extract the edge component in each of the RGB planes of the color image. Further, where it is possible to obtain information close to that of a gray scale image by using only one of the RGB planes of the color image, the process of step S3 may be performed only for one color plane.

Figure 8:
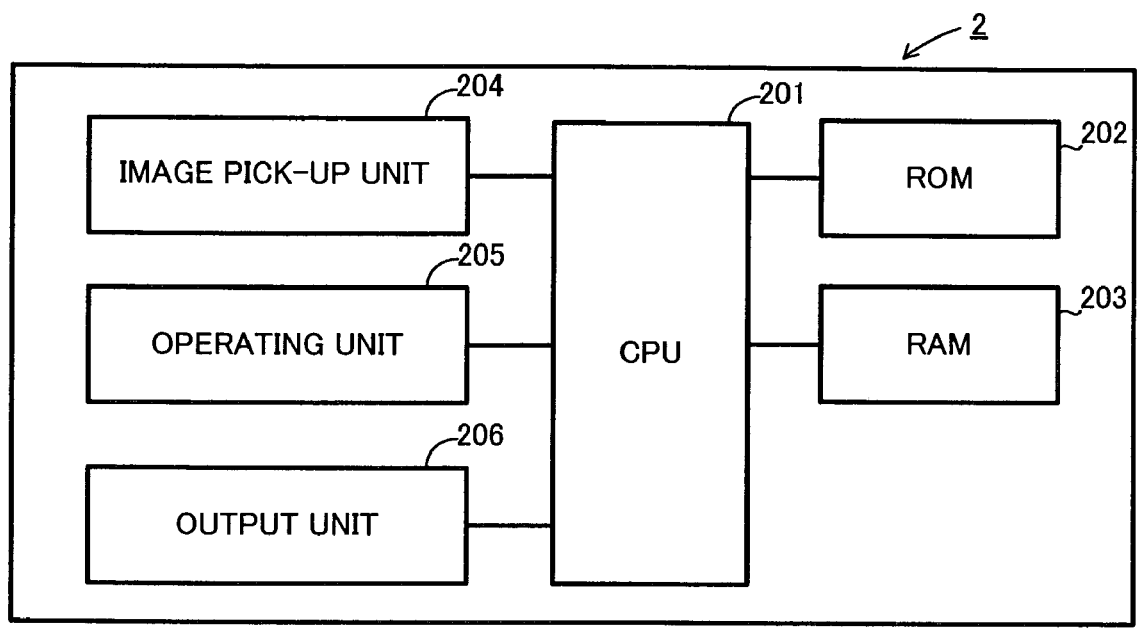
FIG. 8 shows a specific exemplary configuration of a camera 2, when image processing is done by the camera 2.

Though it is described in the embodiment above that image processing is performed by PC 1 on the image captured by camera 2, image processing may be performed by camera 2, if camera 2 has such a configuration as shown in FIG. 8. Referring to FIG. 8, when camera 2 is controlled by a CPU 201 and performs processing of the image picked-up by image pick-up unit 204, the above described image processing may be performed by control unit 201 executing the program. In this case, the program to be executed by CPU 201 of camera 2 is stored in a ROM 202 as a storage unit. RAM 203 serves as a temporary storage area when the program is executed by CPU 201. The user inputs information and instructions through an operating unit 205 including buttons or the like. The image picked-up by image pick-up unit 204, result of processing thereof and so on are output from an output unit 206. Output unit 206 may be a display unit implemented by a liquid crystal panel, or it may be an I/F for transmitting data to other apparatuses. The configuration shown in FIG. 8 represents a general configuration of a digital camera and the like, and the configuration of camera 2 here is not limited to the one shown in FIG. 8.

Further, the method of image processing performed by PC 1 or camera 2 as the image processing apparatus described above may be provided as a program. Such a program may be recorded on a computer readable recording medium such as a flexible disk, CD-ROM, ROM or memory card to be used with a computer, and provided as a program product. Alternatively, the program may be provided recorded on a recording medium such as a hard disk mounted inside the computer. Further, the program may be downloaded though a network.

The provided program product is installed in a program storing unit such as a hard disk and executed. The program product encompasses the program itself and the recording medium on which the program is recorded.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
   an edge image forming unit extracting an edge from an input image to form an edge image;
   an edge smoothed image forming unit smoothing said edge image to form an edge smoothed image;
   a difference calculating unit calculating a difference between said edge image and said edge smoothed image; and
   a binarizing unit binarizing said edge image based on said difference.

2. The image processing apparatus according to claim 1, wherein
   said edge smoothed image forming unit smoothes said edge image using an average filter of 5 pixels×5 pixels to 11 pixels×11 pixels.

3. The image processing apparatus according to claim 1, wherein
   said input image is a gray scale image; and
   said edge image forming unit extracts an edge from said gray scale image to form said edge image.

4. The image processing apparatus according to claim 1, wherein
   said input image is an image obtained by transforming a color image to a gray scale image; and
   said edge image forming unit extracts an edge from said image obtained by transforming said color image to said gray scale image to form said edge image.

5. The image processing apparatus according to claim 1, wherein
   said input image is a color image; and
   said edge image forming unit extracts an edge from at least one plane of said color image to form said edge image.

6. A computer readable medium containing a computer executable program, said program comprising computer executable code to cause a computer to perform:
   an edge smoothed image forming step of forming an edge smoothed image by smoothing an edge image formed based on an input image;
   a difference calculating step of calculating a difference between said edge image and said edge smoothed image; and
   a binarizing step of binarizing said edge image based on said difference.

7. The computer readable medium according to claim 6, wherein the computer executable code is configured to cause a computer to perform the steps such that:
   in said edge smoothed image forming step, said edge image is smoothed by using an average filter of 5 pixels×5 pixels to 11 pixels×11 pixels.

8. The computer readable medium according to claim 6, wherein the computer executable code is configured to cause a computer to perform the steps such that:
   said input image is a gray scale image; and
   in said edge smoothed image forming step, said edge smoothed image is formed by smoothing an edge image formed based on said gray scale image.

9. The computer readable medium according to claim 6, wherein the computer executable code is configured to cause a computer to perform the steps such that:
   said input image is an image obtained by transforming a color image to a gray scale image; and
   in said edge smoothed image forming step, said edge smoothed image is formed by smoothing an edge image formed based on said image obtained by transforming said color image to said gray scale image.

10. The computer readable medium according to claim 6, wherein the computer executable code is configured to cause a computer to perform the steps such that:
    said image is a color image; and
    in said edge smoothed image forming step, said edge smoothed image is formed by smoothing an edge image formed by extracting an edge in at least one plane of said color image.

11. An image pick-up apparatus, comprising:
an image pick-up unit picking-up an image of an object and capturing an object image;
an edge image forming unit forming an edge image by extracting an edge from said object image;
an edge smoothed image forming unit smoothing said edge image to form an edge smoothed image;
a difference calculating unit calculating a difference between said edge image and said edge smoothed image; and
a binarizing unit binarizing said edge image based on said difference.

12. The image pick-up apparatus according to claim 11, wherein
said edge smoothed image forming unit smoothes said edge image using an average filter of 5 pixels×5 pixels to 11 pixels×11 pixels.

13. The image pick-up apparatus according to claim 11, wherein said image pick-up unit captures said object image that is a gray scale image.

14. The image pick-up apparatus according to claim 11, wherein
said image pick-up unit captures said object image that is a color image; and
said edge image forming unit extracts an edge from an image obtained by transforming said object image that is a color image to a gray scale image, to form said edge image.

15. The image pick-up apparatus according to claim 11, wherein
said image pick-up unit captures said object image that is a color image; and
said edge image forming unit extracts an edge from at least one plane of said object image that is a color image, to form said edge image.

16. The image pick-up apparatus according to claim 11, wherein
said image pick-up unit, said edge image forming unit, said edge smoothed image forming unit, said difference calculating unit and said binarizing unit are integrated.

* * * * *